INVENTORS
ERNST BRAUN
GERT BRAUN

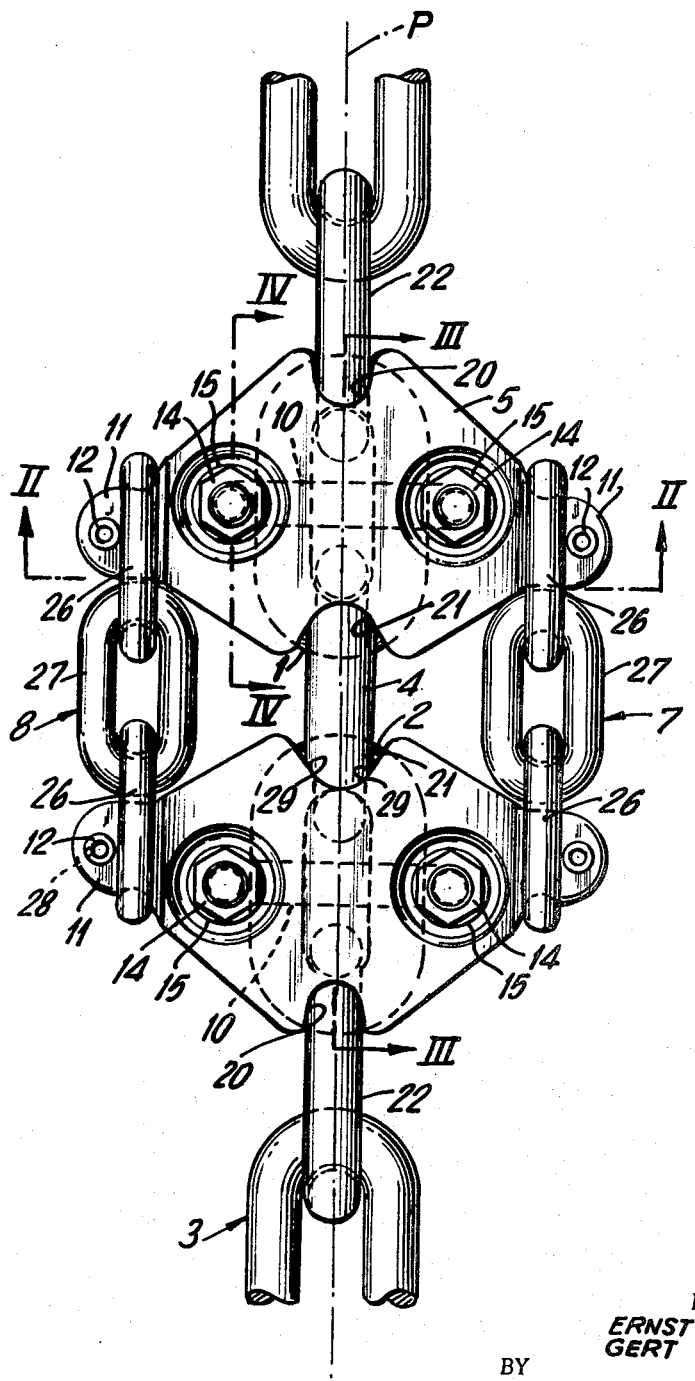
FIG. I
INVENTORS
ERNST BRAUN
GERT BRAUN
BY Karl G. Ross
ATTORNEY

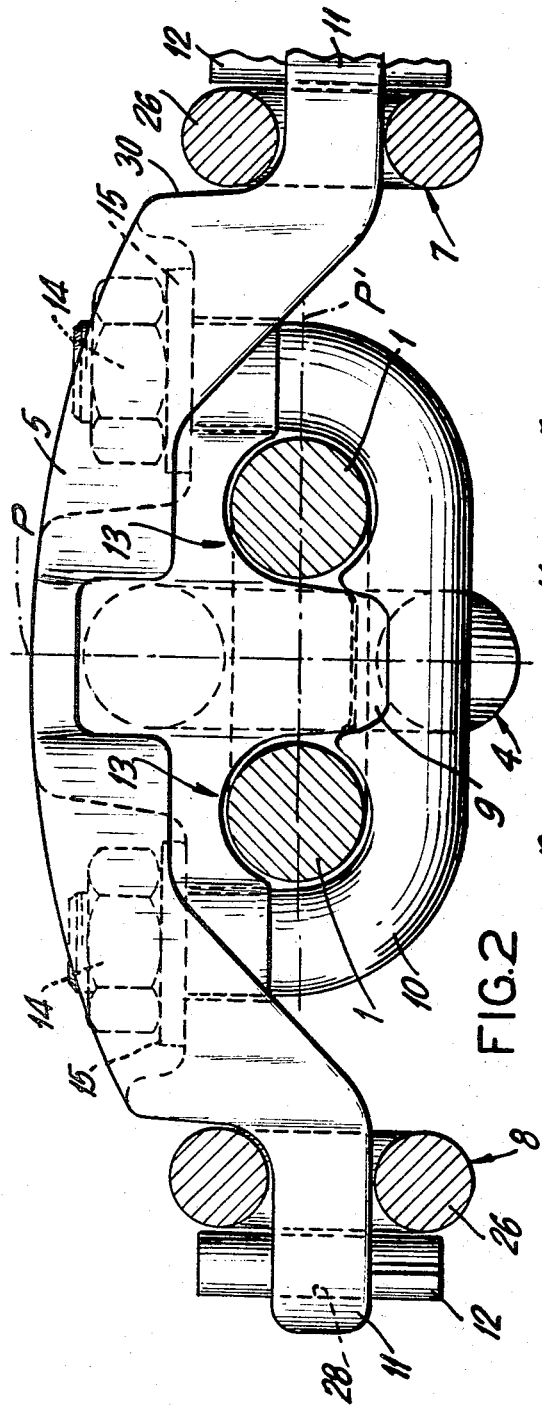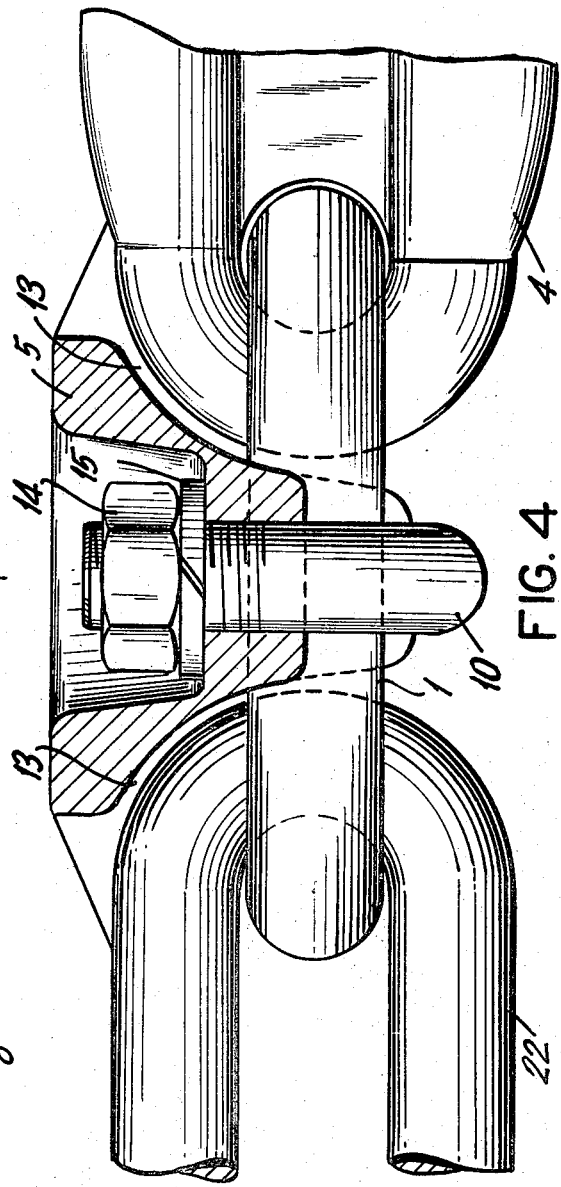

BY Karl F. Ross
ATTORNEY

United States Patent Office 3,419,126
Patented Dec. 31, 1968

3,419,126
CONNECTING DEVICE FOR CONVEYOR
CHAINS AND THE LIKE
Ernst Braun and Gert Braun, Essen-Heisingen, Germany, assignors to Halbach & Braun, Wuppertal-Barmen, Germany, a corporation of Germany
Filed Feb. 21, 1967, Ser. No. 617,635
Claims priority, application Germany, Sept. 29, 1966, H 60,614
9 Claims. (Cl. 198—1)

ABSTRACT OF THE DISCLOSURE

A connecting device for reinforcing an openable scarf-type link interconnecting the chain ends of an endless conveyor chain for single-chain bucket, flight, scraper and apron conveyors of the type used to transfer coal, ore and other heavy bulk material, which comprises a pair of rigid yoke bodies each attached to a respective terminal link of one of the chain ends and having respective pairs of lateral formations or lobes extending transversely to the chain, the rigid yokes or bodies being generally coplanar, and at least one flexible element (i.e., a pair of connecting or reinforcing chains) bridging these yoke bodies with a flexibility permitting normal articulation of the links. The connecting chains extend parallel to the openable link of opposite sides thereof and each having a respective end link receiving one of the lobes of the respective yokes and at least one further link interconnecting the end links of each of these securing chains. The yokes are formed with recesses at their opposite longitudinal sides for receiving the penultimate link of each chain end and the openable connecting link with freedom of relative movement; central projections of the yokes are received within the terminal link of the chain end to which they are attached by U-bolts coplanar with these projections.

---

Our present invention relates to a reinforcing and connecting device for a pair of chain ends adapted to be interconnected by a coupling link of the openable or separable type and, more particularly, to a system for reinforcing the junction between the ends of an endless conveyor chain for single-chain bucket, flight or apron conveyors.

In general, continuous conveyor chains may be joined together between a pair of "chain ends" by an openable or separable connecting link of scarf or similar construction. Such a link has a pair of link parts which are interconnected by a screw, pin or rivet and frequently is formed with a web at an intermediate location along the link through which the pin passes. Chains of this type are common in conveyor arrangements and especially so-called "single-chain conveyors" of the bucket, flight or apron type, in which conveyor members subjected to substantial stress and load are attached at spaced locations to the chain and the latter must pass over sprockets, aprons or rollers serving to guide this chain. The chain is subjected to longitudinal stress proportional to the load carried by the conveyor as well as torsional or lateral stresses resulting from nonuniformity of the load distribution etc. The openable or scarf-type link used to join the chain ends into an endless assembly is characterized by a tendency toward breakage because of a reduced mobility of this link and the mobility of the links connected therewith to articulate. Thus, this link may form a substantially stiffer connection with the terminal links of the chain ends. Rupture of this link occurs more frequently than the rupture of other links and any breakdown of this nature is difficult to repair and may involve substantial downtime.

It is the principal object of the present invention to provide a securing assembly or device which bridges the chain ends at this connecting link and is capable of reinforcing the junction without decreasing the flexibility thereof to the extent that breakage of or damage to the connecting ink will nevertheless permit continued operation of the system.

A further object of my invention is to provide a device of relative simplicity, high strength and good flexibility for interconnecting a pair of chain ends and, especially for reinforcing the junction of a single-chain conveyor of the flight, bucket or apron type.

We have found that these objects can be effectively accomplished by providing to the junction between a pair of chain ends interconnected by a separable, openable or split scarf-type coupling link, a securing or reinforcing device which comprises a pair of rigid coupling bodies or yokes, each attachable to a respective terminal link at one of the chain ends and interconnected by at least one elongated flexible element which joins the bodies together and bridges the chain ends. According to an important feature of this invention, each of the bodies is formed as a butterfly-shaped yoke with laterally extending formations or lobes which are generally coplanar (when the chain is in a flattened state), the flexible element on each side of the coupling link being constituted as a connecting chain parallel to this link and flexibly interconnecting the lobes of these bodies. The connecting chains have end links which receive the lobes and are retained thereon between a shoulder of each of the yokes and a spring cotter seated into the respective lobes outwardly of the connecting chains and serving as an abutment means for retaining same; at least one and possibly a plurality of intermediate links are used to interconnect the external links of the connecting chains. Advantageously, the yokes or bodies are provided with longitudinally extending central portions received in the openings of the respective terminal links of the chain ends, while U-bolts are connected to these yokes and extend around the respective terminal links in the region of this formation to serve as releasable fastening means for the device.

The aforedescribed device has the advantage that even upon breakage of the connecting link, the bridging chains provide a secure and balanced coupling of the chain ends so that continued operation of the conveyor is possible until the next inspection period. The connecting or securing chains may be of a lighter weight than the conveyor chain but are designed to distribute the load between them and to have a total capacity equal to or in excess of that of the conveyor chain. Since the connecting chains or "flexible elements" interconnect the chain ends with freedom of relative mobility and the rigid bodies or yokes themselves may be provided with clearances or recesses into which the penultimate chain link of each chain end and the common coupling link extend with freedom of movement in the planes of the respective links, the flexibility of the connection is equal to or greater than that obtainable with the coupling link alone.

The above and other objects, features and advantages of the present invention will become more readily apparent from the following description, reference being made to the accompanying drawing in which:

FIG. 1 is a plan view of a device interconnecting a pair of chain ends according to the present invention;

FIG. 2 is a sectional view taken along the line II—II of FIG. 1;

FIG. 4 is an enlarged sectional view taken along the line IV—IV of FIG. 1.

Figure 3:
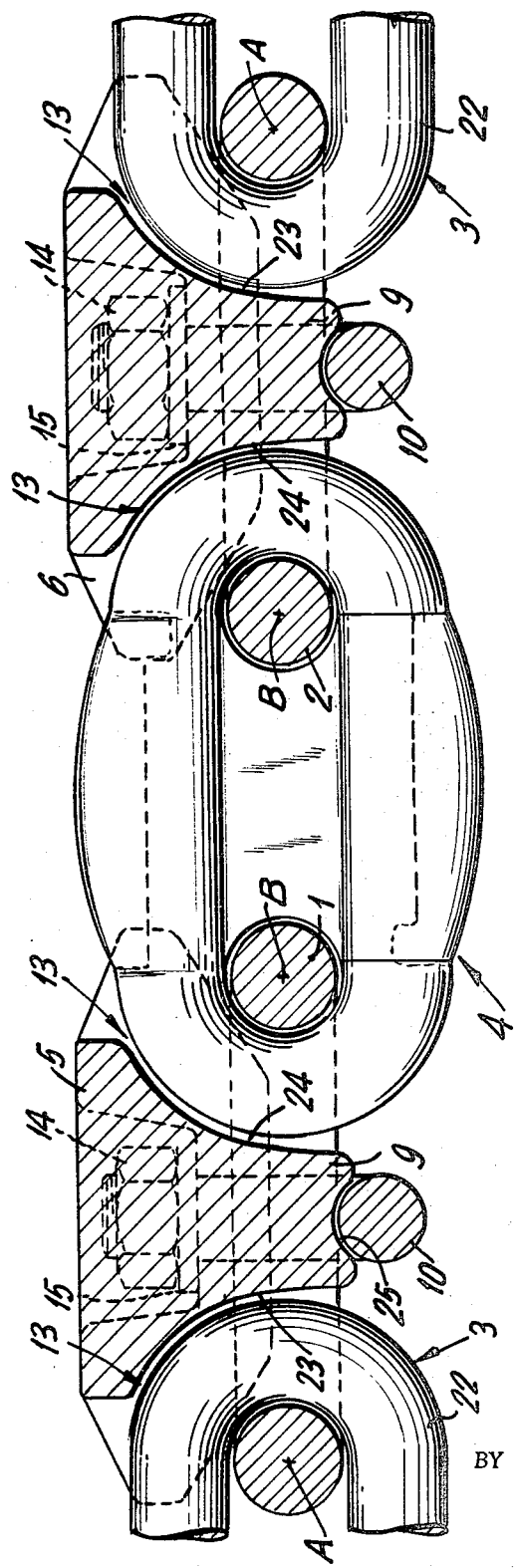
FIG. 3 is a sectional view taken along the line III—III of FIG. 1.

In FIG. 1, we show a device, according to this invention, for ensuring a securer connection of the end links 1 and 2 of an endless conveyor chain 3. As noted earlier, the ends of a conveyor chain of this character are generally interconnected by an openable, separable or scarf-type link 4, which does not adequately secure it when the chain continuously passes along the conveyor trough and around rollers and sprockets; in fact, this connecting member frequently breaks or opens.

To protect and reinforce this type of connection of a conveyor chain, the end links 1 and 2 are provided with a pair of rigid yoke bodies 5 and 6 which reinforce the scarfed link 4. The yoke bodies 5 and 6 are rigidly affixed to the links 1 and 2, but do not interfere with the normal movements and articulations of the chain. Each body 5, 6 is attached to respective link 1 or 2 by means of a U-bolt 10 and recessed nuts 14 and lockwashers 15. The outline of the yoke is such that it covers almost completely the terminal link of the chain end on which is mounted and has a longitudinal projection 9 (FIG. 3) received within the respective links 1 or 2. Furthermore, each yoke is formed laterally with respective offset flanges or lobes 11 (on opposite longitudinal sides of the chain) whereupon are mounted a pair of so-called "securing" or connecting chains 7 and 8 which constitute flexible elongated elements connecting the yokes. These chains 7 and 8 have a flexibility sufficient to permit the device to bend with the chain 3; they are held in position by abutments formed by spring cotters 12 which also prevent them from slipping off the respective flanges.

In FIG. 2 and FIG. 3 we show the cooperation of the locking link 4 and the yokes 5 and 6 mounted on the links 1 and 2. It thus may be seen that the projecting web 9 and its conforming side shape, referred to as 13, give the links their free action.

Thus, each yoke 5 or 6 is shown to be provided with a pair of longitudinally spaced recesses 20 and 21 in the plane P of the chain 3 and the connecting device, the recesses receiving the penultimate links 22 of the respective chain ends while permitting these links to pivot about the axes A with respect to the terminal links 1, 2 to which the yokes 5 and 6 are attached.

The U-bolts 10 are dimensioned so that they fit between each penultimate link 22 and the openable coupling link 4 with which they are coplanar, each projection 9 having curved flanks 23 and 24 centered generally upon the axes A and B of the terminal links 1 and 2. Furthermore, the projections 9, which lie in the plane P of the chain, preferably extend through and beyond the respective links 1 and 2 to form a concave seat 25 in which the U-shaped bolt 10 rests to prevent its movement laterally under stress.

It has been found advantageous to dimension lobes 11 to pass through the end links 26 of each connecting chain 7 or 8. Preferably, these end links lie in planes parallel to the plane P of the connecting link 4 and the penultimate links 22 while being connected by at least one intermediate link 27 generally coplanar with the terminal links 1 or 2 to which the yokes are affixed. The spring pins 12 need only be knocked out of their respective bores 28 to permit the respective end link 26 to be withdrawn laterally when separation of the chain is desired. Furthermore, the recesses 21 are formed with flanges 29 which laterally confine the coupled link 4 and further prevent its self-opening. To prevent frictional deterioration of the lobes 11 or the end links 26, the lobes are offset so as to be substantially coplanar (plane P' of FIG. 2) with the terminal links 1 and 2 and form shoulders 30 along these end links, thus each connecting and reinforcing chain 7 or 8 is held in place between a respective shoulder 30 and the corresponding spring pin 12. We have found, surprisingly, that this construction and configuration of the yokes, the projection 9, the connecting bolt 10 and the outrigger chains 7 and 8, permits the device to pass over the sprocket wheels or other roller arrangements of conventional conveyor chains without difficulty and permits the connection of the end to be maintained even upon breakage of the link 4. The device is easy to assemble and disassemble and has been found to be particularly advantageous when used with single-chain conveyor assemblies as previously described.

The invention described and illustrated is believed to admit of many modifications within the ability of persons skilled in the art, all such modifications being considered within the spirit and scope of the appended claims.

We claim:

1. A device for interconnecting a pair of chain ends, comprising a pair of coupling bodies each attachable to a respective link of one of said chain ends; at least one elongated element flexibly joining said bodies together and bridging said chain ends, said chain ends being interconnected by an openable link interconnecting the links of said ends to which said bodies are secured, said bodies being generally coplanar yokes with respective formations extending laterally of said chain ends on opposite sides thereof; and a pair of elongated elements in the form of connecting chains joining the formations of said bodies on opposite lateral sides of said chain ends.

2. The device defined in claim 1 wherein each of said yokes has a central projection extending into the respective link of the respective chain end, and a pair of laterally extending lobes constituting the respective formations of the bodies forming said yokes.

3. The device defined in claim 2, further comprising respective fastening means releasably securing each of said bodies to the respective link of the respective chain end.

4. The device defined in claim 3 wherein each of said fastening means includes a U-bolt extending around the respective link of the respective chain end and clamping same to said body.

5. The device defined in claim 4 wherein each U-bolt lies in a plane transverse to the respective link of the respective chain end and at least partly surrounds the respective center portion of each body.

6. The device defined in claim 1, further comprising abutment means on each of said formations laterally outwardly of the respective connecting chain for retaining same on the respective formation.

7. The device defined in claim 6 wherein said abutment means includes a spring cotter received in each of said lobes outwardly of the respective connecting chain, said lobes each having a shoulder lying inwardly of the respective connecting chain whereby said connecting chains are retained on said lobes between the respective spring cotter and the respective shoulder.

8. The device defined in claim 7 wherein each of said connecting chains includes a respective terminal link receiving the respective lobe and at least one further link interconnecting the terminal links of each connecting chamber.

9. The device defined in claim 8 wherein said chain ends are part of an endless conveyor chain and said bodies are each formed on opposite longitudinal sides with respective recesses for receiving the penultimate link of the respective chain end and said openable link with freedom of articulate movement of said penultimate link and openable link in the planes thereof.

References Cited

UNITED STATES PATENTS 2,779,454    1/1957    Sigardson    198—176
3,270,494    9/1966    Holmes    59—86

RICHARD E. AEGERTER, *Primary Examiner.*